June 28, 1949.　　　　R. AMSLER　　　　2,474,798
HEAT REGULATING APPARATUS
Filed Jan. 18, 1941.
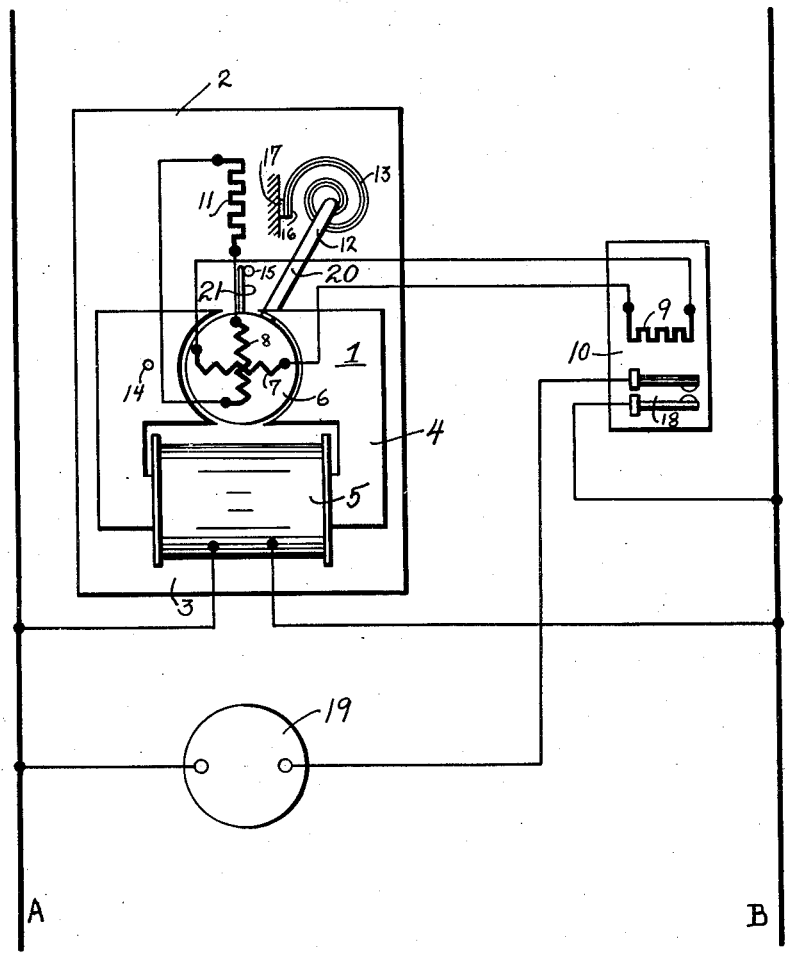
Inventor:
Robert Amsler
by
Morgan, Finnegan and Durham
Attorneys Patented June 28, 1949

2,474,798

UNITED STATES PATENT OFFICE 2,474,798

HEAT REGULATING APPARATUS

Robert Amsler, Zug, Switzerland, assignor to Landis & Gyr, A.-G., Zug, Switzerland, a body corporate of Switzerland Application January 18, 1941, Serial No. 374,970
In Switzerland December 7, 1939

Sections 1, 3, 10, Public Law 690, August 8, 1946
Patent expires December 7, 1959

3 Claims. (Cl. 236—91)

There have already been employed thermostats responding to the heat losses and provided with auxiliary heating means and a thermally controlled contactor for the regulation of the interior temperature of a building heated by a heating plant in accordance with the exterior temperature. Thus with such thermostats the arrangement is sometimes such that an external thermostat intermittently switches on and off the auxiliary heating means of an inside thermostat acting on the regulating member of the heating plant.

However, in such regulating plants the inside thermostat has such a thermal inertia that it does not respond to every impulse of the external thermostat but to a mean value of the impulses. This inertia of the applied thermostat in its turn causes fluctuations in the regulation when there are very rapid alterations of temperature and with progressive switching movements there is a danger of oscillations being set up. Certainly the applied thermostat could be made as a very small apparatus of low mass. A small applied thermostat of this kind however in its turn involves an extremely high frequency of switching of the external thermostat. Independently of the fact that an external thermostat of this kind can hardly be made in practice with a very low thermal inertia, the high frequency of switching thereof, both from the radio technical point of view and also in respect of the life of the contacts, is extremely unsatisfactory.

The invention relates to a regulating arrangement designed for the regulation of the internal temperature of buildings, wherein the auxiliary heating of an internal thermostat controlling the regulating member of the heating plant is controlled by an external thermostat. In order to avoid the above mentioned disadvantage according to the invention use is made of the property of an induction regulator known per se for regulating purposes, in that the auxiliary heating of the internal thermostat is controlled by an induction regulator arranged in the external thermostat, the induction of such regulator being altered by temperature sensitive means. For the induction regulator there can be employed either a regulating transformer or a regulating inductor or choking coil, in which arrangement the temperature sensitive means altering the induction may be for example a bimetal spiral or a thermally sensitive alloy.

In the accompanying drawings there is shown by way of example one constructional form of a regulating plant, wherein a rotary transformer is employed for the induction regulator.

A rotary transformer 1 of an external thermostat 2 has a primary winding 5 mounted on the yoke 3 of the standard 4 and two secondary windings 7, 8 arranged at an angle of 90° relatively to one another on a rotary armature 6. The secondary winding 7 is connected to a heating winding 9 of an applied thermostat 10 having a low thermal inertia and the secondary winding 8 is connected to a heating winding 11 of the external thermostat 2. Thermostat 10 is preferably located internally of the building to be heated under its control. One end 12 of a bimetal spiral 13 is connected to the rotary armature 6, e. g. by means of a shaft 20 and a lever arm 21 on the armature is capable of being moved between the stops 14 and 15. The other end 16 of the bimetal spiral 13 is fixed to a part 17 capable of being adjusted by hand in order to set the apparatus to any desired room temperature. A bimetal contactor 18 of the applied thermostat 10 is arranged in the circuit of a regulating member 19. The regulating arrangement is connected to the network conductors A, B.

According to the layout of connections shown in the drawing the rotary armature 6 takes up a position in which the secondary winding 7 lies in the direction of the flux or force produced by the primary winding 5 and the secondary winding 8 lies at right angles to such flux of force. The flux of force is then coupled with the secondary winding 7 so as to produce the weakest induction and with the secondary winding 8 so as to produce the strongest induction. Consequently a maximum current is induced in the secondary winding 8, whilst there is no current in the secondary winding 7. The bimetal spiral 13 of the external thermostat 2 is therefore heated by the heating winding 11 to the greatest extent and the bimetal contactor 18 of the thermostat 10 is not heated at all by the heating winding 9.

The rotary armature 6 in the position shown in the drawing lies against the stop 15, which corresponds to the case when a definite low external temperature, for example —20°, exists and the temperature does not rise. The bimetal spiral 13 is then only heated to such an extent by the heating winding 11 now taking a maximum current, that the rotary armature 6 is still held against the stop 15. No current then flows in the secondary winding 7.

An external temperature still lower than —20° does not then cause any alteration in the position of the rotary armature 6, since this by reason of the stop 15 cannot be turned further in the clockwise direction. Only on a sufficient rising of the external temperature will the bimetal spiral 13 move the rotary armature 6 again in the counterclockwise direction and thereby move it away from the stop 15, whereby finally by the compensating effect of the heating winding 11 on the one hand and of the external temperature on the other hand, the rotary armature 6 will take up a position corresponding to this higher temperature.

If the external temperature alters further, a corresponding adjustment of the rotary armature 6 will be again effected by the bimetal spiral 13. On any falling of the external temperature the rotary armature 6 is moved in the clockwise direction and on any rise of the external temperature it is moved in the counterclockwise direction. The current flowing in the windings 7, 8 is then correspondingly altered namely in the first mentioned case it will be larger and smaller respectively and in the second mentioned case smaller and larger respectively.

On a very considerable rise of the external temperature, for example to +20°, the bimetal spiral 13 will move the rotary armature 6 to such an extent, that it comes to rest against the stop 14. Since the secondary winding 8 then carries no current, the bimetal spiral 13 cannot be heated by the heating winding 11. The external temperature of +20° likewise effects a heating of the bimetal spiral 13 to +20°, during which time the rotary armature 6 is still held against the stop 14. The bimetal spiral 13 solely heated by the external temperature of +20° and therewith the rotary armature 6 thus retain their position, so long as the high external temperature of +20° exists. The secondary winding 7 then carries a maximum current, whilst no current flows through the secondary winding 8.

If the external temperature rises still more, that is to say beyond +20°, there will be no alteration in the position of the bimetal spiral 13 and of the rotary armature 6. In any falling of the temperature below +20° on the other hand the bimetal spiral 13 will move the armature 6 in the clockwise direction, so that by means of the alteration of the inductive conditions thereby taking place the secondary winding 7 receives less current and the secondary winding 8 again receives current.

The rotary armature 6 is thus moved by the bimetal spiral 13 in one or the other direction, wherein these movements are not only dependent on the external temperature, but by reason of the heat generated by the heating winding 11 are dependent on the weather conditions, such as wind, rain, sun, snow, heat radiation and the like. The heat losses in the interior of the external thermostat are consequently greater not only when the temperature falls, but also when there is wind and similar phenomena. In any such case the movement of the rotary armature 6 in the clockwise direction takes place to a greater degree than corresponds to the instantaneous temperature existing. It may also be mentioned that when for example with any required limiting regulated value of —20° wind or other similarly acting phenomena are to be taken into consideration, the induction regulator must obviously be so set, that the rotary armature 6 solely on the occurrence of an external temperature of —20° does not come to rest against the stop 15, but that a certain amount of movement is available for taking into account the wind. The rotary armature 6 will then only rest against the stop 15 at —20° and with a definite amount of wind.

The current flowing in the secondary winding 7 and altered by the movement of the rotary armature 6 dependent on the temperature is conducted to the heating winding 9 of the applied thermostat 10. The heating winding 9 will then develop from time to time an amount of heat corresponding to this current. This heat, which, as appears from what has been said above, will be all the greater the higher the external temperature, acts as additional heat to the heat given off by the flow pipe. The heat of the heating winding 9 will therefore together with the flow pipe temperature determine the opening and closing of the bimetal contactor 18. If the external temperature is high, the now greater heat of the heating resistance 9 will also effect a correspondingly earlier opening of the closed bimetal contactor 18 than with a lower external temperature. The procedure in the applied thermostat 10 is thus that, on reaching a definite heat condition produced by the heat of the heating winding 9 and of the flow pipe, the closed bimetal contactor 18 acting on the regulating member such as a draft regulating motor 19 is opened and it is opened all the earlier the greater the thermal action of the heating resistance 9 varying in direct proportion to the external temperature. By the opening of the bimetal contactor 18 the regulating member 19 is closed or switched off in a known manner, whereby the temperature of the flow pipe again falls after a certain time. After a definite falling of this flow pipe temperature the applied thermostat 10 will finally be cooled to such an extent that the bimetal contactor 18 is again closed. The regulating member 19 is then again opened or switched in, whereby the already described procedure is repeated.

From the above described operation of the regulating arrangement it can thus be recognized that the bimetal contactor 18 controlling the regulating member 19 is altered from time to time in dependence on the weather and on the temperature of the flow pipe, which has for its result that the room temperature to be regulated remains substantially constant. By this means the regulation of the room temperature takes place without employing contacts in the external thermostat which are subject to wear.

What I claim is:

1. A control apparatus for heating plants including in combination an internal thermostat, a resistance heater therefor, an external heater, an external induction regulator controlling the power supplied to the heaters, and a thermally responsive control for the regulator to increase the power supplied to the internal heater and to decrease the power supplied to the external heater as the external temperature increases.

2. A control apparatus for heating plants including in combination an internal thermostat, a resistance heater therefor, an external heater, an external rotary variable transformer controlling the power supplied to the heaters, and a thermally responsive control for the regulator to increase the power supplied to the internal heater and to decrease the power supplied to the external heater as the external temperature increases.

3. A control apparatus for heating plants including in combination an internal thermostat, a resistance heater therefor, an external thermally responsive rotary transformer having its windings arranged at 90° to each other and supplying power to the internal resistance heater to decrease the heat transferred to the internal thermostat as the external temperature drops and an external heater for heating the external transformer.

ROBERT AMSLER.

REFERENCES CITED

The following references are of record in the file of this patent:

UNITED STATES PATENTS

| Number | Name | Date |
|---|---|---|
| 1,997,559 | Hajek | Apr. 9, 1935 |
| 1,999,053 | Kingsland | Apr. 23, 1935 |
| 2,063,613 | McCarthy | Dec. 8, 1936 |
| 2,083,932 | Von Ohlsen | June 15, 1937 |
| 2,171,803 | Parks et al. | Sept. 5, 1939 |
| 2,183,874 | Shivers | Dec. 19, 1939 |
| 2,344,991 | Lilja | Mar. 28, 1944 |

FOREIGN PATENTS

| Number | Country | Date |
|---|---|---|
| 212,457 | Switzerland | Feb. 17, 1941 |
| 499,235 | Great Britain | Jan. 20, 1939 |